United States Patent [19]
Gust

[11] Patent Number: 4,664,583
[45] Date of Patent: May 12, 1987

[54] TRAILER WITH CONVEYOR BED

[75] Inventor: Jacob N. Gust, West Fargo, N. Dak.

[73] Assignee: J.D. Enterprises, Inc., Fargo, N. Dak.

[21] Appl. No.: 784,530

[22] Filed: Oct. 4, 1985

[51] Int. Cl.$^4$ .............................................. B65G 17/12
[52] U.S. Cl. .................................... 414/528; 198/841; 414/327
[58] Field of Search ................ 414/327, 528; 198/841

[56] References Cited

U.S. PATENT DOCUMENTS

| | | |
|---|---|---|
| 568,583 | 9/1896 | Richards . |
| 749,695 | 1/1904 | Litchfield . |
| 1,322,031 | 11/1919 | Litchfield et al. . |
| 1,438,566 | 12/1922 | Wiggins . |
| 2,496,463 | 2/1950 | Gaddis ............................ 414/528 |
| 2,717,703 | 9/1955 | Kull et al. . |
| 3,482,717 | 12/1969 | Moser . |
| 3,876,089 | 4/1974 | Moser ............................ 414/528 |
| 4,013,167 | 3/1977 | Bourgeois ..................... 198/841 |
| 4,055,265 | 10/1977 | Eisenman ................... 198/844 X |
| 4,377,365 | 3/1983 | Layh ......................... 414/528 X |
| 4,545,477 | 10/1985 | Besch ........................... 198/841 |

OTHER PUBLICATIONS

Brochure for Flow Boy Model 24B, by the J. H. Holland Co.

Primary Examiner—Robert J. Spar
Assistant Examiner—Stuart J. Millman
Attorney, Agent, or Firm—Merchant, Gould, Smith, Edell, Welter & Schmidt

[57] ABSTRACT

A trailer assembly is disclosed for receiving, transporting and discharging flowable bulk material. The trailer assembly includes a pair of opposing generally vertical side walls which are secured to a frame member and converge downwardly and inwardly. The side walls are joined by a front end wall and a rear wall to define a bin having an open floor. A conveyor is provided as a floor for the bin with the conveyor extending beneath the side walls and having a width greater than the distance between bottom edges of the side walls and positioned closely adjacent to the bottom edges of the side walls. The conveyor includes a pair of opposing endless chains which are mounted about sprockets with the chains connected by cross members. Flexible conveyor belt sections are provided secured to the cross members at a leading edge of the belt sections with trailing edges of the belt sections free to overlap leading edges of successive belt sections. Upper tracks of the chains are supported by a support bar secured to the frame member and having a vertical portion which extends between chain links to engage link pins in supporting rolling engagement.

6 Claims, 7 Drawing Figures

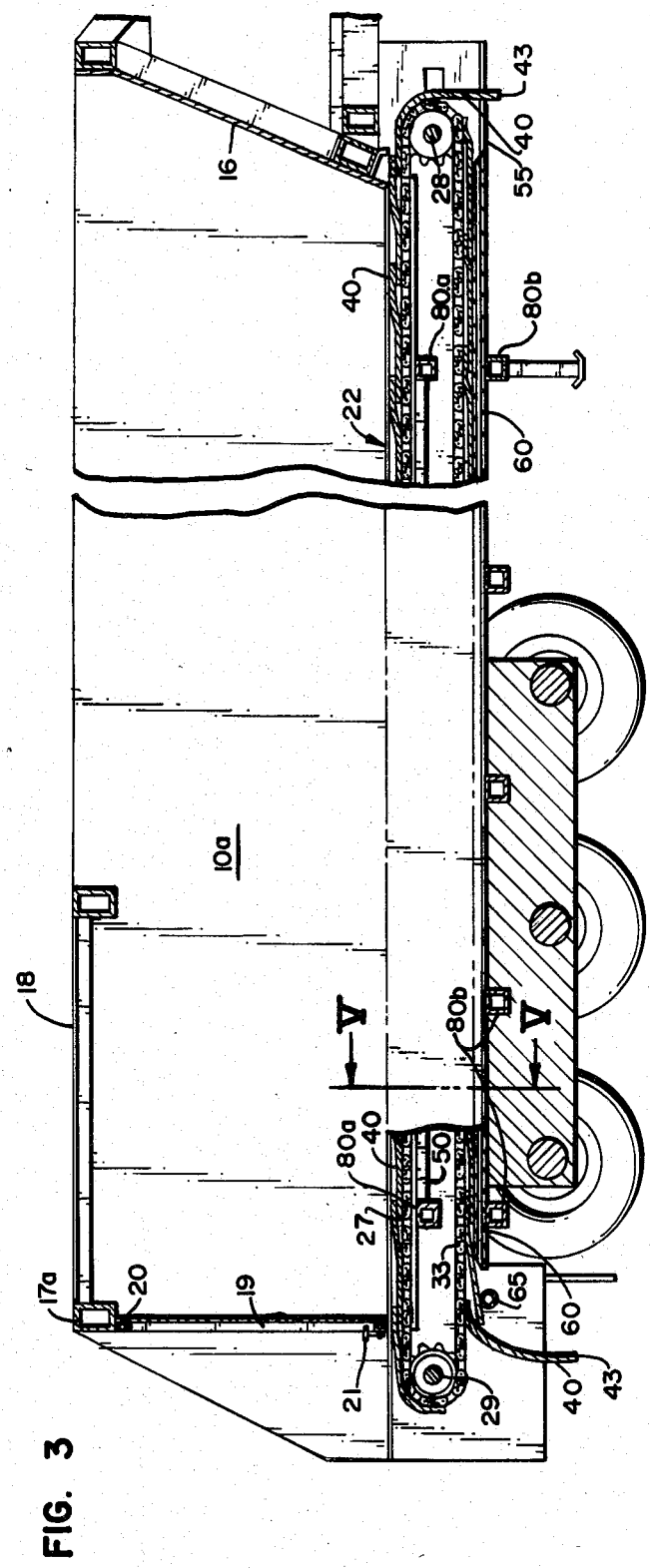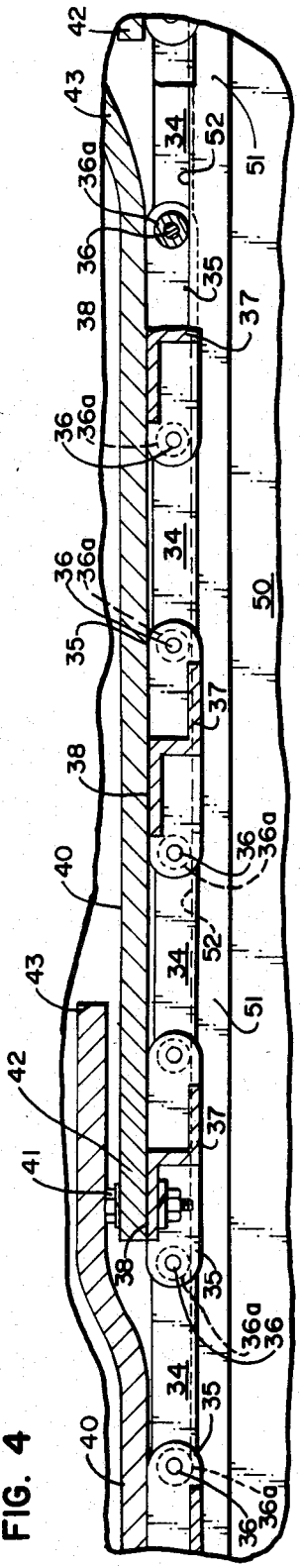
FIG. 3
FIG. 4

TRAILER WITH CONVEYOR BED

BACKGROUND OF THE INVENTION

I. Field of the Invention

This invention relates to a trailer assembly for receiving, transporting and discharging flowable bulk material. More particularly, this invention pertains to such an assembly having a bin with a conveyor as the bin floor.

II. Description of the Prior Art

Trailer assemblies comprising bins with conveyors located at the floor of the bin are well known. Examples of these are U.S. Pat. No. 2,496,463 to Gaddis; U.S. Pat. No. 3,876,089 to Moser and U.S. Pat. No. 4,055,265 to Eisenman. The Eisenman patent teaches a bulk bed material carrier for receiving, transporting and discharging bulk quantities of material. Specifically, the Eisenman patent teaches a bulk bed material carrier for agricultural products.

While bulk bed material carriers with conveyor floors are well known, the use of such carriers in certain applications has resulted in certain difficulties. Specifically, it would be desirable to utilize such carriers in the construction industry to haul flowable bulk material such as aggregate. Also, it would be desirable to use such carriers to haul asphalt using the conveyor floor to discharge the asphalt at a metered rate during road paving operations. An example of such a trailer assembly for use in the construction trades is a trailer marketed under the trade name Flow Boy Model 24B by the J. H. Holland Company. The Flow Boy model has opposing chains connected by horizontal transverse rails which scrape across the top of a bin floor. Such an arrangement carries asphalt out of the bin. However, this arrangement can have disadvantages with aggregate which is abrasive and can damage the rails or the floor. Also, such an arrangement is not practical with wet concrete. Indeed, I am not aware of a bulk bed material carrier with a conveyor floor which may practically be used with concrete except for the present invention.

A problem which arises in the use of such conveyor floored trailer bins for hauling aggregate or asphalt is that the material may enter the conveyor mechanism and damage the mechanism or impede its performance. This problem is particularly highlighted when the transported material is aggregate or similar abrasive material. In addition to the problems associated with contamination, construction materials are of high density and conveyor floored bins are subject to extreme loads which can impair operation of a motor driven conveyor.

OBJECTS AND SUMMARY OF THE INVENTION

It is an object of the present invention to provide a trailer assembly for handling flowable bulk material with a conveyor floor for discharging the material.

Another important object of the present invention is to provide a trailer assembly having a conveyor floored bin which avoids contamination of the conveyor mechanism by handled material.

A still further object of the present invention is to provide a trailer assembly with a conveyor floor which minimizes power requirements to operate the conveyor when it is carrying a heavy load.

According to a preferred embodiment of the present invention, a trailer assembly for receiving, transporting and discharging flowable bulk material is provided which includes a frame member which supports a pair of generally vertical opposing side walls which converge downwardly and inwardly. A front end wall is secured to the frame member and extends between the side walls as does a rear end wall which is secured to the frame member. The rear end wall is provided with a horizontal pivot at its upper connection to the side walls permitting the rear end wall to pivot away from the side walls and define a discharge opening. The rear end wall, front end wall and side walls cooperate to define a floorless bin for receiving flowable bulk material. The trailer assembly further comprises a conveyor which defines a movable floor for the bin. The conveyor system includes a pair of endless chains which move around sprockets secured to the frame member. The chains are spaced apart a distance greater than the width of the bottom of the bin and the chains carry flexible belt sections which have a width greater than the bottom of the bin. A leading edge of the belt section is secured to the chains and a trailing edge of the belt section is left free to overlap a leading edge of a successive belt section.

BRIEF DESCRIPTION OF THE DRAWINGS

FIG. 3 is a view of the trailer assembly taken along line III—III in FIG. 2;

FIG. 4 is a view taken in elevation showing a chain mechanism enlarged;

DETAILED DESCRIPTION OF THE PREFERRED EMBODIMENT

Figure 1:
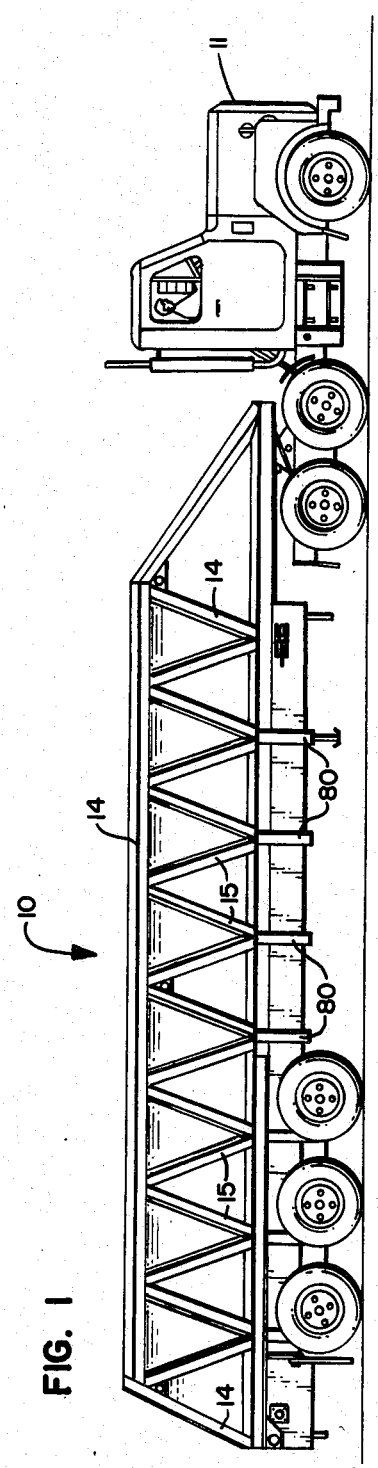
FIG. 1 is an elevation view of a trailer assembly attached to a cab.
Figure 2:
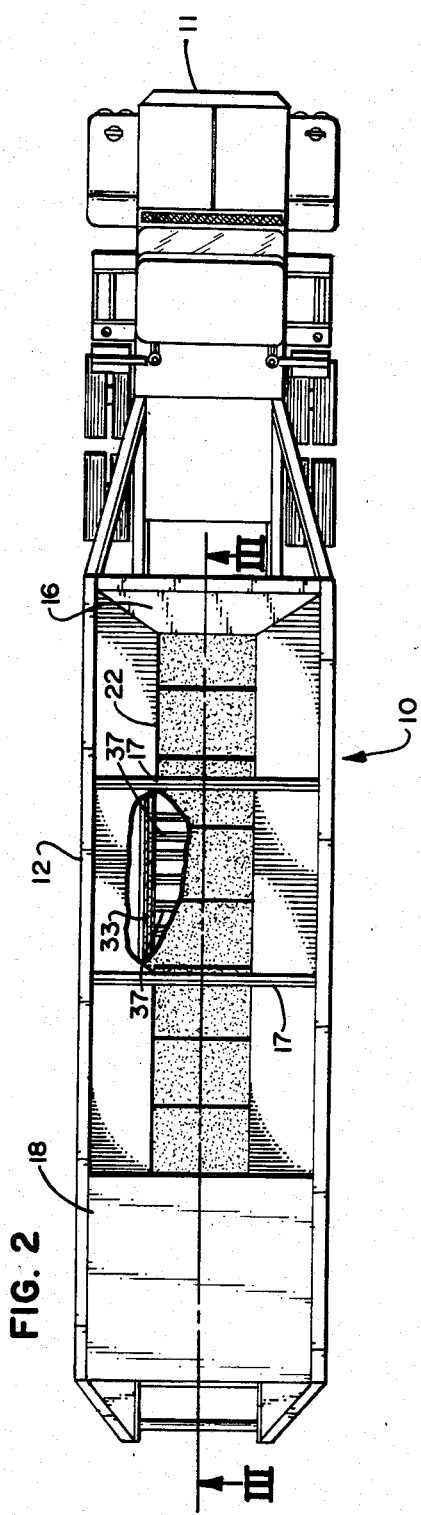
FIG. 2 is a top view of the trailer assembly and cab of FIG. 1 with a portion of the bin broken away.

FIGS. 1 and 2 show a trailer assembly generally designated by the numeral 10 mounted to the frame of a cab 11. The trailer assembly includes a pair of opposing side walls 12 and 13 which are generally vertical and converge downwardly and inwardly. As it is intended that the present invention would be particularly suitable for conveying heavy construction material, the side walls 12 and 13 are braced by rectangular steel bracing 14 which surrounds the perimeter of the side walls. Cross bracing 15 further supports the side walls and joins the upper bracing and lower bracing 14. The trailer assembly 10 also includes a forward wall 16 which is generally vertical and joins the forward edges of the side walls 12 and 13. Rigid lateral supports 17 and roof portion 18 extend between the upper edges of side walls 12 and 13 and provide additional rigid structural support. As best shown in FIG. 3, a rear wall 19 is provided having a horizontal and transverse pivot connection 20 to a brace 17a extending between side walls 12 and 13 at the rearward end of the side walls. A latch 21 secures the rear wall in a closed position as shown in FIG. 3. Rear wall 19, forward wall 16 and side walls 12 and 13 cooperate to define a bulk material bin 10a.

Figure 5:
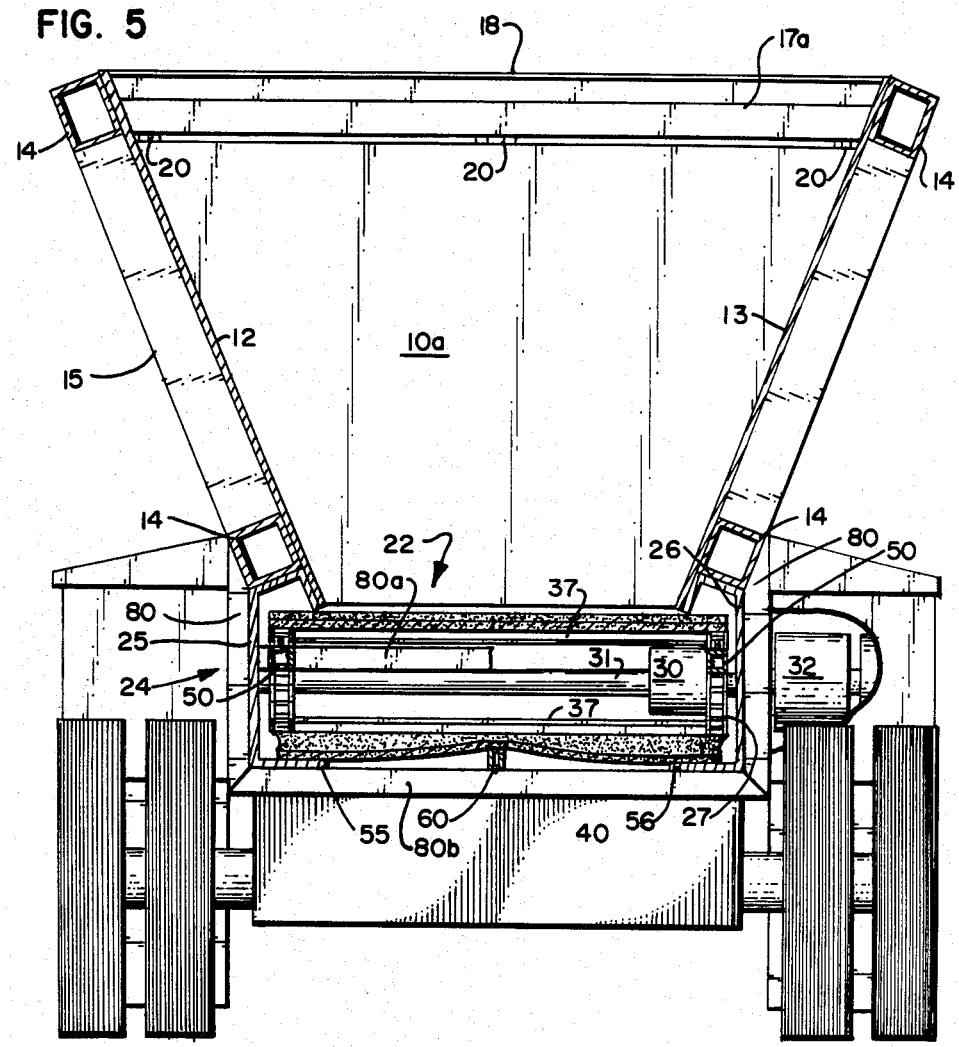
FIG. 5 is a view generally taken along line V—V of FIG. 3.

The floor of the bulk material bin is a moving conveyor which is generally shown at 22. With reference to FIGS. 5 and 3, it can be seen that the trailer assembly is provided with a frame member 24 which comprises a pair of vertical spaced apart support plates 25 and 26. The support plates 25 and 26 support the side walls 12 and 13 respectively. Vertical braces 80 are provided at spaced intervals on both of plates 25 and 26 and are provided with lower horizontal braces 80b and upper horizontal braces 80a to provide rigid structural support.

The support plates 25 and 26 support a pair of transversely spaced endless chains 27 defining upper and lower tracks. It will be appreciated that both endless chains are identical and a description of one will suffice as the description of the other and all identical parts will be numbered identically. Shown most clearly in FIG. 3, the chain 27 includes an idler sprocket 28 secured to the frame member forward of the bottom edge of the forward wall 16. The idler sprocket 28 is mounted for rotation about a horizontal axis transverse to the support member support plates 25 and 26. Likewise, a driven sprocket 29 is mounted on the support member rearward of the rear wall 19. The driven sprocket 29 is mounted for rotation about an axis parallel to the axis of the idler sprockets 28. As shown in FIG. 5, the driven sprockets 29 are joined by means of a coupler 30 to a common shaft 31 with both of the sprockets driven by means of a power source 32.

Figure 7:
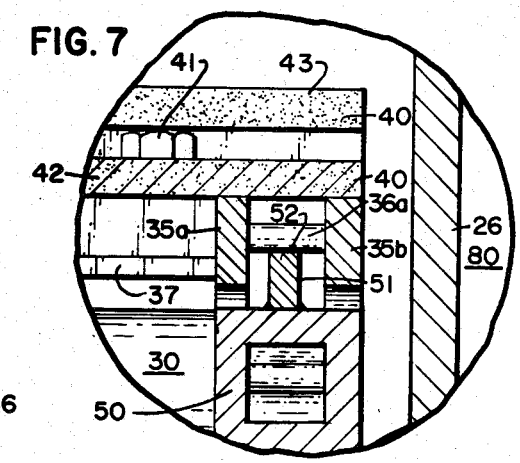
FIG. 7 is an enlarged portion of a view of FIG. 6 showing support means for the chain assembly.

With reference to FIGS. 3 and 4, the chain mechanism 27 includes an endless link chain 33 which is entrained in meshing engagement about the drive sprocket 29 and idler sprocket 28. The link chain 33 comprises a plurality of inner links 34 and outer links 35 alternately arranged with an inner link 34 connected to a contiguous outer link 35 by means of a common pivot pin 36. As shown in FIGS. 7 and 4, the pivot pins 36 are each surrounded by cylindrical rollers 36a. The pair of link chains 33 are interconnected by means of transverse cross members 37 which extend between opposing outer links 35. As shown in FIG. 4, the cross members 37 have a Z-shaped cross section with a generally flat upper surface 38 generally flush with the upper surface of links 35.

A plurality of flexible conveyor belt sections 40 are provided secured to the chains 33. The belt sections 40 are secured to the chains 33 by means of a plurality of bolt and nut means 41 securing a leading edge 42 of a belt section 40 to the generally flat upper surface 38 of a cross member 37. A trailing edge 43 of the belt section 40 is left free with belt sections 40 sized sufficient for the trailing edge 43 of a belt section to overlap a leading edge 42 of a successive belt section.

As shown most clearly in FIG. 5, the chains 33 are arranged such that the distance between the chains is greater than the width of the distance between the side walls at their bottom edge. With this arrangement, the belt sections 40 extend beyond the bottom edges of the side walls 12 and 13. Likewise, the chains 33 are positioned such that the belt section 40 is in close proximity to the bottom edges of the side walls 12 and 13. Accordingly, only a portion of the belt sections 40 are exposed to the interior of the bin with the exposed portions acting as the floor of the bin. Also, the portions of the belt section 60 extending beyond side walls 12 and 13 are sized to have a width sufficient such that the extended portions act as supplementary conveyors outside the bin 106. The supplementary conveyors cover the chains 33 and protect them from material which might escape the bin 106.

Figure 6:
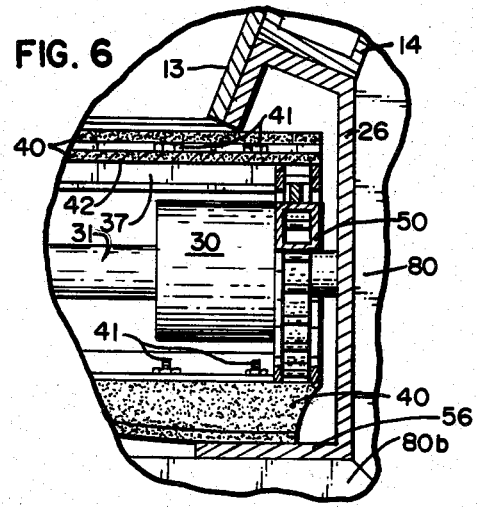
FIG. 6 is an enlarged portion of FIG. 5 showing the sprocket and chain assembly.

The frame member 24 carries means for supporting the chains and belt sections with these means most clearly shown in FIGS. 6 and 7. To support the upper track of the link chain 33, a support tube 50 is provided. The support tube 50 is positioned beneath the upper track of the link chain 33 and extends approximately the complete length of the chain between the sprockets 28 and 29. The tube 50 extends between upper horizontal braces 80a and has an upper surface flush with the upper surfaces of braces 80a with tube 50 welded to braces 80a. The support tube 50 is provided with a vertical support 51 which is sized to extend between vertical link plates 35a and 35b of all of the chain links with an upper bearing surface 52 of the vertical support 51 engaging rollers 36a in rolling support.

To support the trailing edges 43 of the belt sections 40 on the lower track of the chains, the side walls 25 and 26 of the support member are provided with inwardly projecting flanges 55 and 56 respectively which are positioned beneath the lower track of the chain assembly. Flanges 55 and 56 support outer edges of the belt sections 40 in sliding engagement during operation of the trailer assembly which will be described more fully. The belt sections 40 are also supported by means of a longitudinally extending support bar 60 which is provided centrally spaced between the flanges 55 and 56 and is secured to the frame member 25.

In operation of the trailer assembly, the rear wall 19 is pivoted to its closed position as shown in FIG. 3 and secured in the position by means of latch 21. Material to be transported by the trailer is passed into the top of the bin between the support bars 17. The material rests on the portion of the belt sections 40 exposed to the interior of the bin. The carried material is kept within the bin by means of the close proximity between the belt sections 40 and the bottom edges of the side walls 12 and 13. Also, the weight of the material results in the belt sections 40 and their supporting cross members 37 becoming slightly concave thereby reducing the clearance between the belts 40 and the edges of the side walls 12 and 13. Structural support for the belts 40 is provided by the cross members 37 which eliminate the need for a rigid floor. Additionally, any concave configuration also prevents migration of the carried material past the sides of the belts 40 since the concave shape would tend to draw the material back towards the center of the belt. Finally, if material does escape past the side walls 12 and 13, the width of the belts 40, being greater than the space between the side walls, protects the chain mechanism since the escaped material can be carried on the excess width portion of the belts 40 and removed.

When it is desired to discharge carried material from the bin, latch 21 is released and the rear wall 19 is free to pivot about its pivot axis 20. The rear wall may be supported open in any desired manner or could be left to freely pivot with the weight of the conveyed material keeping the rear wall 19 in an open position. With the rear wall 19 freely pivotable, the power means is activated and the chains rotate about the sprockets drawing the belt sections 40 in a circular path with the upper track moving toward the rear wall and the lower track moving toward the forward wall 16 with the result that the carried material is drawn by the belt sections 40 out of the bin and discharged. As a belt section 40 passes the driven sprockets 29, the belt flips down as shown in FIG. 3. As the belt section 40 continues to move on the lower track, it engages a transversely extending pipe 65 which draws the belt to a flat configuration. The belt 40 continues to move on the lower track with the side edges and center of the belts supported by the flanges 55 and 56 and support bar 60 respectively. Once so supported, the flexible belt portions 40 assume a double concave configuration as shown in FIG. 5. With this means of support, the belt sections 40 are protected during operation yet the bottom track of the chain assemblies are not completely enclosed thereby providing a passage along the entire length of the bottom track to permit discharge out of the chain assembly of any material which may have migrated into the assembly between the upper and lower tracks. Also, spacing between tubes 50 and walls 25 and 26 permit material to pass.

In addition to avoiding contamination of the chain assembly by bulk material to be carried by the trailer, the present invention also provides for improved power requirements for the chain assembly since the chains are supported by the vertical support 51 which engages the rollers 36a. This results in greatly reduced friction and greatly reduces the load on the power source because the chain rolls instead of slides. Also, the Z-shaped cross member eliminates need for a floor.

From the foregoing, it has been shown that the present invention provides a trailer assembly for receiving, transporting and discharging flowable bulk material with the trailer assembly including a bin having a conveyor floor. Specifically, it has been shown how the present invention provides for such a trailer assembly while providing means for avoiding contamination of the conveyor assembly by carried material and providing a support mechanism for the trailer assembly which reduces load on the conveyor's power source. While the foregoing is a description of the preferred embodiment of the present invention, it is intended to have the present invention and its disclosure to include all modifications and equivalents which would occur to those skilled in the art. Therefore, the scope of the invention is intended to be limited only by the claims which are appended hereto.

What is claimed is:

1. A trailer assembly for receiving, transporting and discharging flowable bulk material comprising:
   a frame member;
   a pair of opposing generally vertical side walls secured to said frame member and converging downwardly and inwardly;
   a front end wall secured to said side walls;
   a rear wall secured to said side walls;
   opposing surfaces of said rear wall, side walls and front end wall defining a bin for receiving bulk material;
   bottom edges of said rear wall, side walls and front end wall defining an exposed opening at a bottom of said bin;
   bin discharge means provided on said rear wall;
   a conveyor disposed beneath said bottom edges and in close proximity thereto and defining a movable floor for said bin and covering said opening; said conveyor including a drive sprocket means rotatably mounted to said frame member about a transverse horizontal axis at said rear end;
   an idler sprocket means rotatably mounted to said frame member about a transverse horizontal axis at said front end with opposing idler and drive sprockets spaced apart distances greater than a distance between bottom edges of said side walls;
   a pair of endless chains interconnected by a plurality of spaced transverse cross members; said chains being entrained in meshing engagement about said drive and idler sprocket means with said entrained chains defining coplanar upper and lower tracks;
   means secured to said frame for supporting said chains along said upper track;
   power means operatively connected to said drive sprocket means for moving said upper track of said chains in a rearward direction;
   a plurality of flexible conveyor belt sections fixed to said chain and covering said upper track, said belt sections sized to have a width greater than a width of said exposed opening, said belt sections along said upper track each having a leading edge facing toward said rear end and fastened to said chain and said belt sections having a free trailing edge facing toward said front end and overlapping a leading edge of a successive belt section, said belt sections secured to said chain with central portions of said belt sections on said upper track exposed to an interior of said bin and with said belt sections on said upper track in close proximity to said bottom edges, side portions of said belt sections extending from said central portions beyond and beneath said bottom edges of said side walls;
   means secured to said frame member for supporting outer edges of said overlapped belt sections as said sections move on said lower track; and
   portions of said flexible belt sections within said lower track being generally unsupported and free to assume a repose with contiguous belt sections having spaced apart portions defining material flow passageways in communication with a generally unobstructed volume defined between said upper and lower tracks.

2. A trailer assembly according to claim 1 wherein said frame member includes a pair of generally vertical opposing support plates with said idler and drive sprockets secured to said plates and with said means for supporting said outer edges of said belts comprising inwardly projecting flanges projecting from said support plates beneath said lower track.

3. A trailer assembly according to claim 2 comprising a support bar secured to said frame member beneath said lower track with said bar extending the length of the lower track and disposed between said flanges and aligned to engage a portion of said trailing edge in supporting engagement.

4. A trailer assembly according to claim 1 wherein said chains are link chains with links comprised of opposing vertical link plates joined by horizontal pin means; said means for supporting said upper track comprising a support rail secured to said frame member and extending the length of the upper track and sized to extend between vertical link plates with an upper bearing surface of said portion engaging said pin means in support.

5. A trailer assembly according to claim 4 wherein said pin means comprise link pins joining said link plates with said link pins provided with coaxial cylindrical rollers with said rollers engaging said upper bearing surface.

6. A trailer assembly for receiving, transporting and discharging flowable bulk material comprising:

a frame member having a pair of generally vertical opposing support plates;

a pair of opposing generally vertical side walls secured to each of said support plates and converging downwardly and inwardly to bottom edges with bottom edges of said side walls spaced apart a distance less than a distance between said support plates;

a front end wall secured to said side walls;

a rear wall secured to aid side walls;

opposing surfaces of said rear wall, side walls and front end defining a bin for receiving bulk material;

bottom edges of said rear wall, side walls and front end wall defining an exposed opening at a bottom of said bin;

bin discharge means provided on said rear wall;

a pair of opposing idler sprockets rotatably mounted to each of said support plates with said idler sprockets rotatable about a transverse horizontal axis at said front end with said idler sprockets spaced apart a distance greater than the distance between bottom edges of said side walls;

a pair of drive sprockets rotatably mounted on each of said support plates and rotatable about a transverse horizontal axis at said rear end with said drive sprockets spaced apart a distance greater than a distance between bottom edges of said side walls;

a pair of endless link chains each being entrained in meshing engagement about drive and idler sprockets on a common support plate with said endless link chains defining coplanar upper and lower tracks;

power means operatively connected to said drive sprockets for rotating said drive sprockets and moving said upper track of said chains in a rearward direction;

a plurality of spaced transverse cross members connecting a plurality of opposing links of said endless chains;

a plurality of flexible conveyor belt sections each having a forward edge when on an upper track facing said rear end and a trailing edge facing said forward end with means for securing leading edges of said belt sections to a plurality of said transverse cross members and said belt sections having said trailing edge being free with a distance between said trailing edge and said leading edge being sized for a free trailing edge to overlap a leading edge of a successive belt section;

said conveyor belt sections sized to have a width transverse to said side walls greater than said distance between said bottom edges of said side walls;

a pair of support rails secured to each of said opposing support plates and extending inwardly beneath an upper track of said chains with said support rails provided with a vertical support member extending the length of said upper track and sized to extend between vertical link plates of said chain links with an upper bearing surface of said vertical support engaging said link pins in support;

said belt sections secured to said cross members with central portions of said belt sections on said upper track exposed to an interior of said bin and with said belt sections on said upper track in close proximity to said bottom edges, side portions of said belt sections extending from said central portions beyond and beneath said bottom edges of said side walls;

horizontal support plates extending inwardly from said vertical support plates beneath said lower track of said chains with support plates having a bearing surface sized to engage trailing edges of said belt sections and maintain outer edges of said belt sections in generally horizontal configuration when said belt sections are on said lower track; and portions of said flexible belt sections within said lower track being generally unsupported and free to assume a repose with contiguous belt sections having spaced apart portions defining material flow passageways in communication with a generally unobstructed volume defined between said upper and lower tracks.

* * * * *

UNITED STATES PATENT AND TRADEMARK OFFICE
CERTIFICATE OF CORRECTION

PATENT NO. : 4,664,583

DATED : May 12, 1987

INVENTOR(S) : Jacob N. Gust

It is certified that error appears in the above-identified patent and that said Letters Patent is hereby corrected as shown below:

Column 2, line 7, "securred" should be --secured--; and

Column 8, line 37, "continguous" should be --contiguous--.

Signed and Sealed this

Fifteenth Day of September, 1987

*Attest:*

DONALD J. QUIGG

*Attesting Officer*  *Commissioner of Patents and Trademarks*